United States Patent [19]
Nigrelli et al.

[11] Patent Number: 5,176,494
[45] Date of Patent: Jan. 5, 1993

[54] STACKED ARTICLE DESTACKING AND FEEDING SYSTEM

[75] Inventors: Terry J. Nigrelli, Kiel; Thomas Schumacher, Rosendale, both of Wis.

[73] Assignee: Nigrelli Systems, Inc., Kiel, Wis.

[21] Appl. No.: 661,064

[22] Filed: Feb. 25, 1991

Related U.S. Application Data

[63] Continuation-in-part of Ser. No. 450,396, Dec. 14, 1989, abandoned.

[51] Int. Cl.⁵ ................... B65G 59/10; B65G 59/06
[52] U.S. Cl. .................. 414/795.6; 414/786; 414/797.6; 414/797.7
[58] Field of Search ............... 221/222, 218, 237, 259; 414/793.5, 793.7, 795.6, 797.6, 786, 797.7, 798.9, 797.2

[56] References Cited

U.S. PATENT DOCUMENTS

| | | | |
|---|---|---|---|
| 3,658,194 | 4/1972 | Gendron et al. | 414/795.6 |
| 4,364,466 | 12/1982 | Mojden | 414/798.9 X |
| 4,915,578 | 4/1990 | Becker | 414/797.6 |
| 4,938,649 | 7/1990 | ter Horst et al. | 414/798.9 X |
| 4,986,731 | 1/1991 | Shinomiya | 414/798.9 |

Primary Examiner—Michael S. Huppert
Assistant Examiner—Janice Krizek
Attorney, Agent, or Firm—Fuller, Ryan, Hohenfeldt & Kees

[57] ABSTRACT

A destacking/feeding system separates individual articles such as flat container blanks or trays nested in a stack. The destacking and feeding system comprises at least two pairs of opposed endless feed conveyor belts having respective vertical runs. The feed belts are spaced apart to grip opposite sides of the articles to feed them downwardly along a path to a second pair of belts or wheels which travel at a second, higher speed. The feed belts feed the stack of nested trays to the second, higher speed belts, which accelerate the lowermost articles and propel them downstream at the second speed. At the lower end of the second, higher speed conveyor, the articles are released and fall sequentially by gravity onto a waiting conveyor.

29 Claims, 4 Drawing Sheets

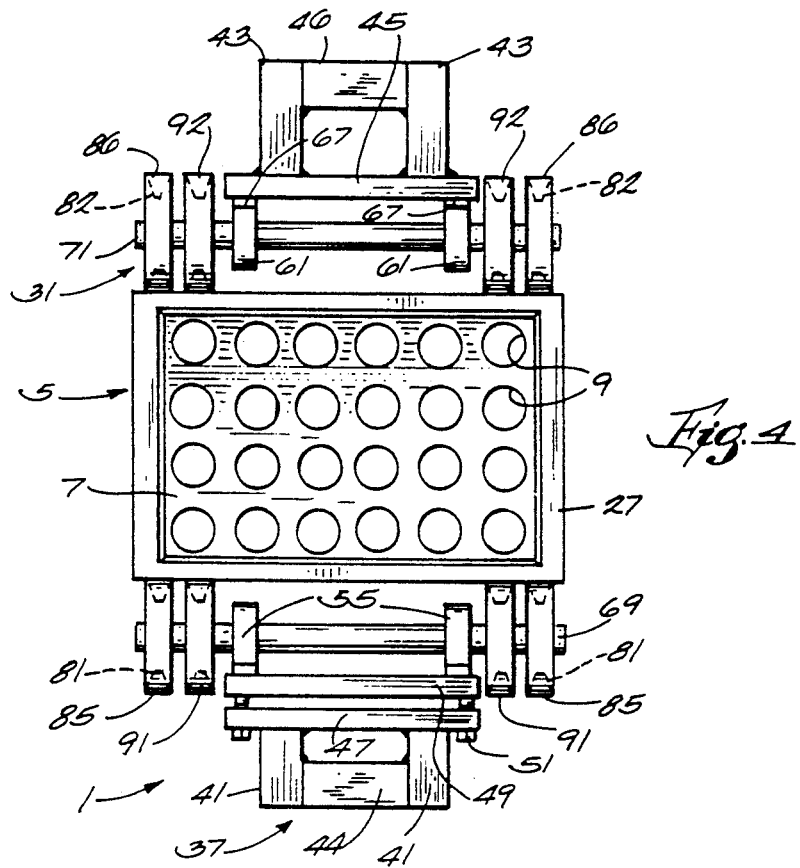
Fig. 4
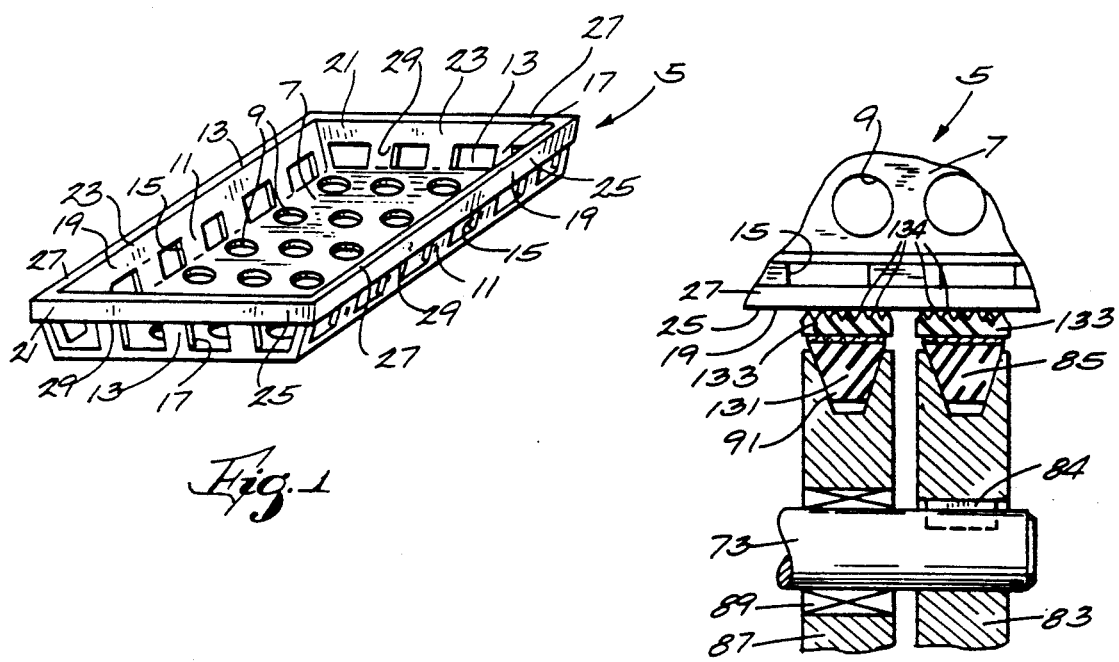
Fig. 1
Fig. 5

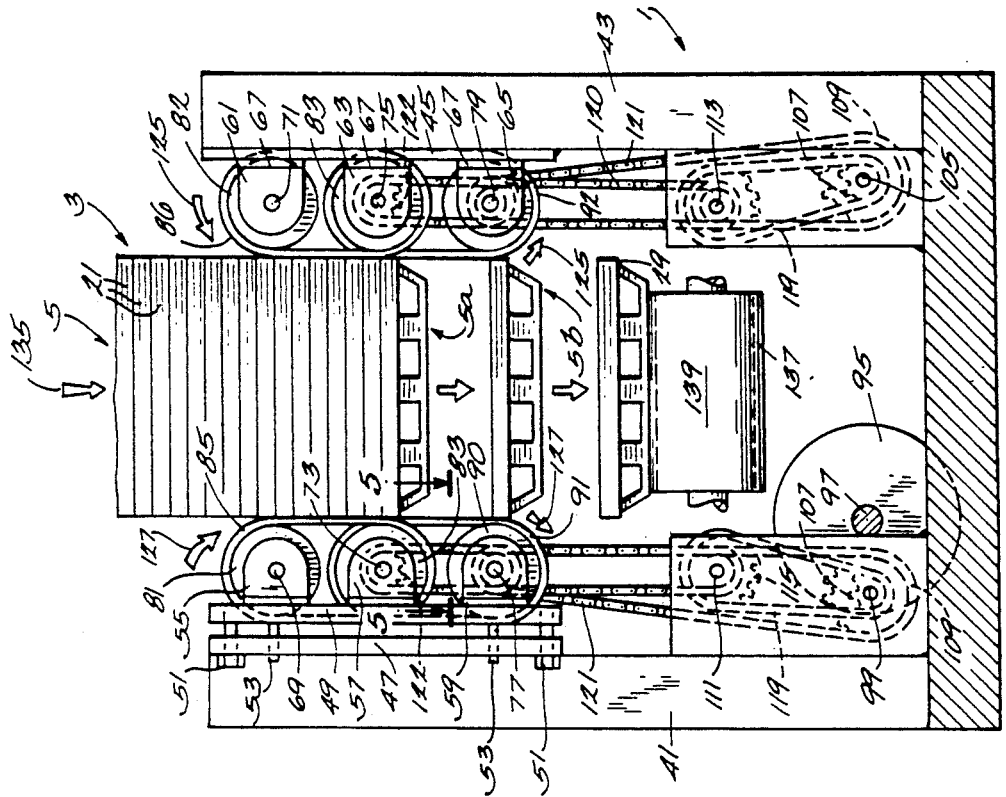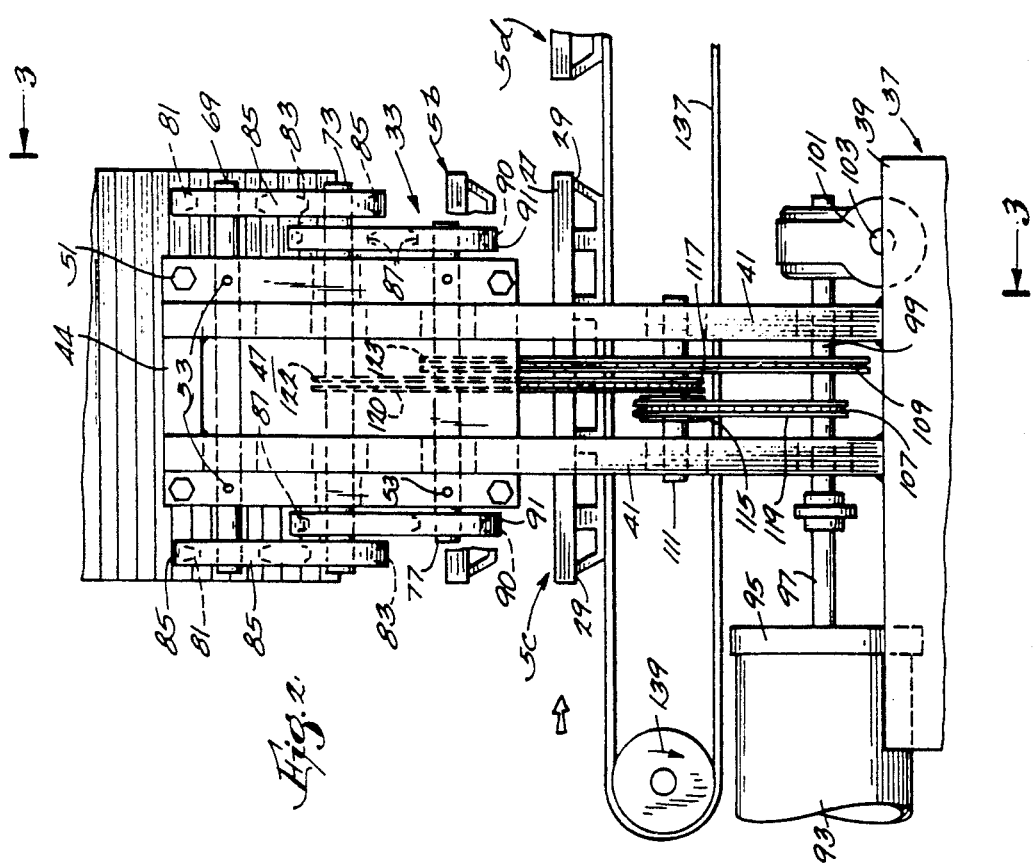

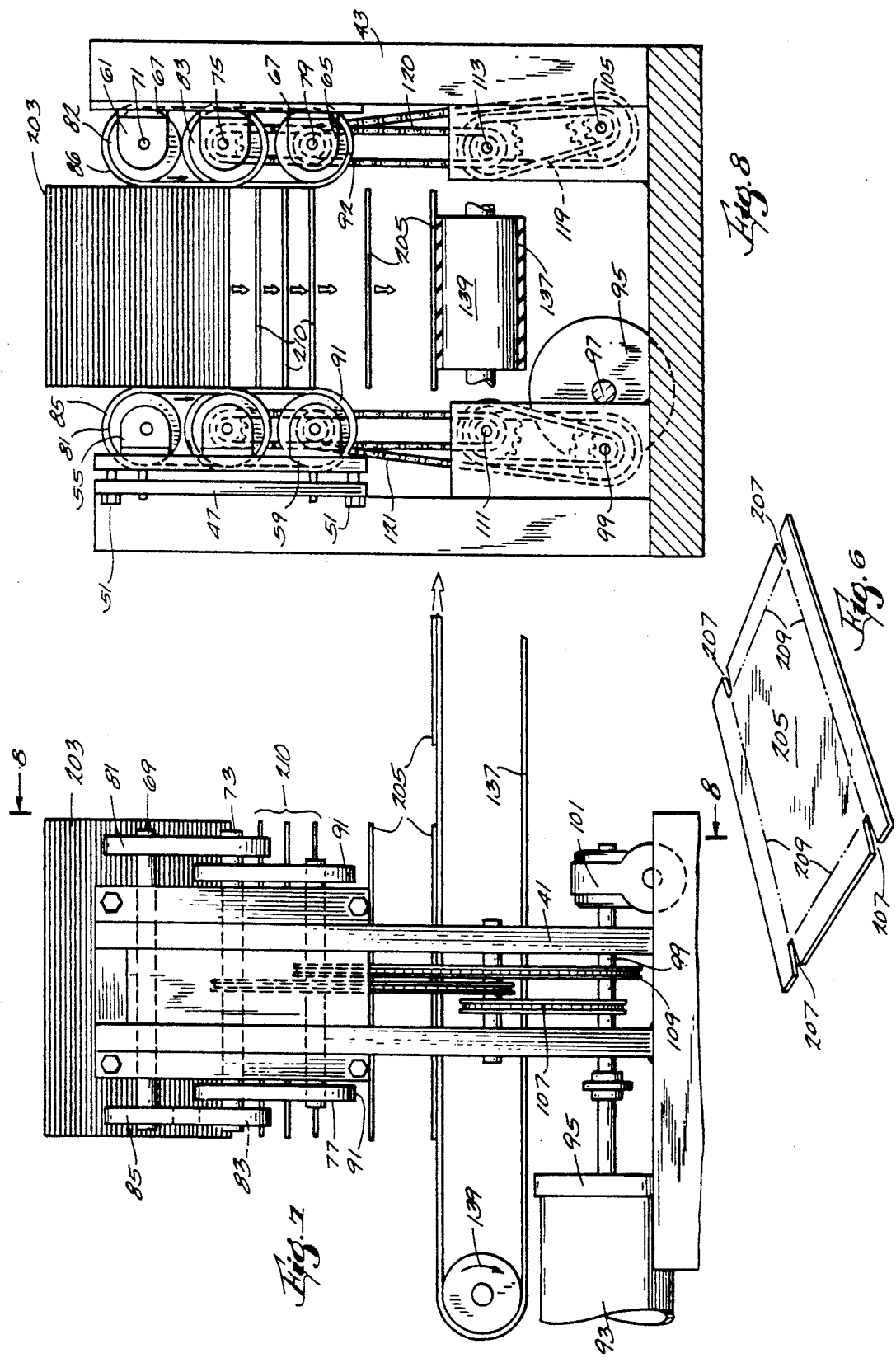

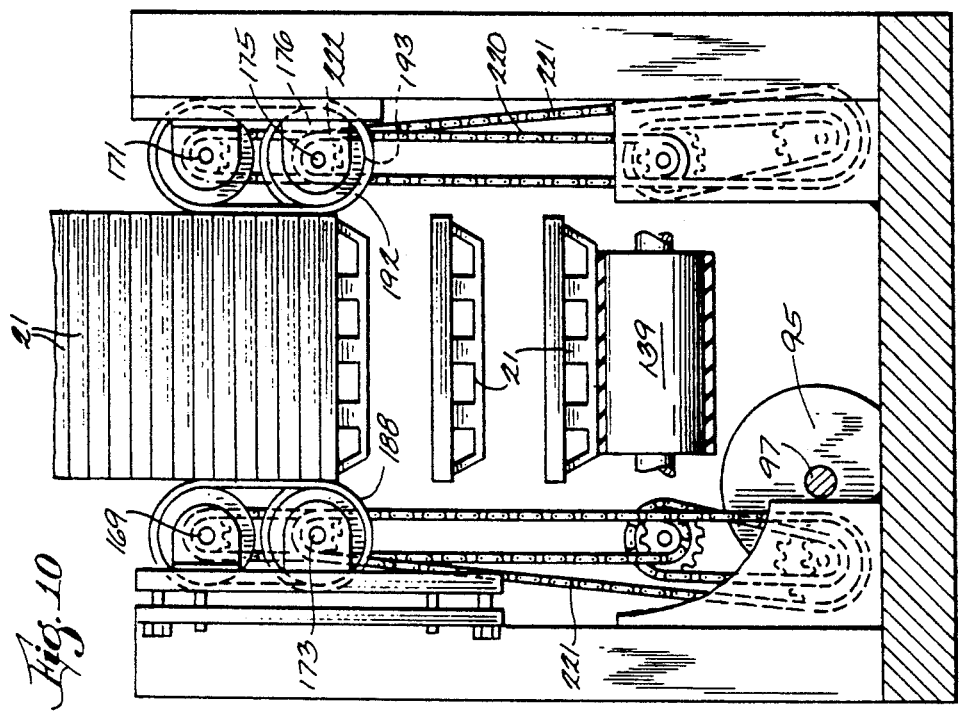
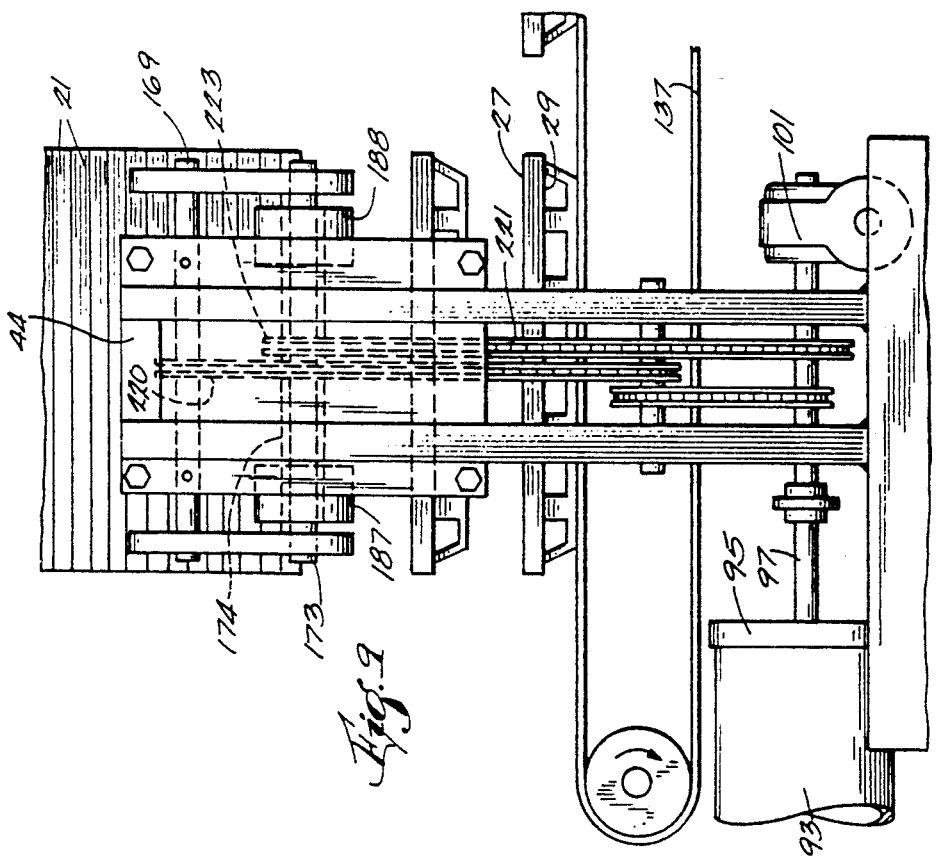

STACKED ARTICLE DESTACKING AND FEEDING SYSTEM

This application is a continuation-in-part of our co-pending application Ser. No. 07/450,396 filed Dec. 14, 1989, now abandoned.

BACKGROUND OF THE INVENTION

1. Field of the Invention

This invention pertains to article handling, and more particularly to apparatus for separating and feeding stacked and/or nested containers or flat sheets of stiff materials such as cardboard container blanks.

2. Background Art

Modern machinery is capable of loading open top containers on a high speed basis with many kinds of articles. The articles and containers are fed in separate but synchronized parallel paths to a loading station, at which complements of the desired number of articles are deposited into the containers. Other industrial processes require feeding of sheets of flat material from a stack onto a conveyor, individually. Some containers are fed in flat form and folded after destacking into the shape of the final containers.

Types of open top containers have proliferated in recent years. Although the traditional paperboard carton is still in widespread use, other types of containers are becoming increasingly popular. For example, plastic trays of various sizes and shapes are widely used to hold beverage bottles and cans. The trays are generally characterized by having relatively low sides compared with their widths and lengths, i.e. the trays are quite shallow.

Plastic trays are fully formed when they reach the loading machine. Even with trays that are relatively shallow, it is highly desirable that the trays be nested within one another in a stack to conserve shipping and storage space. Accordingly, the ability to supply trays in nested stacks to a loading machine represents an advantage over non-nestable trays. On the other hand, before the trays can be filled, they must be separated from each other, removed from the stack and conveyed, one at a time to the machine loading station.

A need exists for machinery that separates stacked articles and feeds them individually onto a moving conveyor.

SUMMARY OF THE INVENTION

In accordance with the present invention, a destacking and feeding system is provided that separates stacked sheets or de-nests a stack of nested trays and deposits them individually on a conveying means. This is accomplished by apparatus that includes at least two pairs of opposed conveyors formed of endless belts that frictionally grip opposite sides of the stacked articles and sequentially accelerate them along a path at increased speed.

The destacking and feeding system comprises at least first and second spaced apart pairs of vertically oriented feed conveyors. The first pair comprise downwardly moving runs that face similar downwardly moving runs of the second pair so as to define a downwardly directed path. The downwardly moving conveyors are spaced apart a distance slightly less than the width of the articles to be de-stacked. The first pair moves together at a constant but relatively slow speed, while the second pair moves together at a constant but higher speed. In one embodiment of the invention each such conveyor preferably comprises a pair of endless belts spaced apart so that one pair engages each end of the stack. However, one conveyor can be formed of a wide belt which engages each side of the stack at the center thereof with the other being formed by pairs of narrower belts, one pair at each end of the stack. In a different embodiment the lower conveying means is formed by spaced apart pairs of opposed, higher speed driven wheels at each end of the stack.

The destacking and feeding system further is characterized by the fact that each of the conveyors frictionally grips opposite sides of the stacked articles and transports them at the above described constant speeds. The second, higher speed conveyors have runs that are generally coplanar with the corresponding runs of the first pair of feed conveyors. The second, higher speed conveyors are located downstream along the path from the first conveyors and the second, higher speed conveyors are preferably positioned so that they slightly overlap the downstream ends of the first conveyors. Thus, the destacking path extends in the downstream direction from between the first and second pairs of feed belts that preferably form the first conveyor to between the higher speed belts or wheels of the second conveyor. The nested trays or other articles are supplied to the destacking and feeding system in vertical stacks. A stack is inserted vertically between the facing feed belts of the first conveyor so as to be located in the conveying path. The feed belts grip the opposite sides of the articles and feed the entire stack downwardly. Eventually, the bottom of the stack reaches the location where the second, higher speed conveyors overlap the associated feed belts. At that point, the second, higher speed conveyors grip the lowermost article, which is immediately separated from the stack and accelerated to the higher speed. As each successive article is pulled away from the slower moving stack, a second, higher speed stack of spaced apart articles is formed in the second conveyor, in the first embodiment of the invention. If wheels are employed for the second conveyor the articles are fed individually rather than as a separated stack. The second conveyor propels the separated articles downstream at the higher speed. The articles at the bottom of the higher speed run are released one at a time to fall by gravity a short distance to a moving conveyor. The conveyor speed is timed with the destacking and feeding system to properly space the individual trays along the conveyor for loading with articles at a loading station or for further processing of the articles.

The spacing between the opposed first and second pairs of conveyors is adjustable to suit different width articles. The present invention, moreover, is capable of handling trays or other articles having different heights without requiring any changes to the system.

The first and second conveyors, although traveling at different speeds, are driven from a common input drive. Speed changing means such as chains and sprockets are used to drive the conveying means at their respective speeds. Sensing devices are employed to assure that a supply of articles is always at the article loading station and that the articles are properly deposited on the destacking system from the supply stack. A reverse switch may be employed to raise the stack along the conveying path to clear any jams that might occur, as, for example, due to a broken tray, bent carton blank or other obstruction.

Other objects, aims and advantages of the invention will become apparent to those skilled in the art upon reading the disclosure.

BRIEF DESCRIPTION OF THE DRAWINGS

FIG. 1 is a perspective view of a typical open top tray that is advantageously handled by the present invention.

FIG. 2 is an end view of the destacking and feeding system of the present invention.

FIG. 3 is a cross-sectional view taken along line 3—3 of FIG. 2.

FIG. 4 is a top view of FIG. 3.

FIG. 5 is an enlarged partial cross-sectional view taken along line 5—5 of FIG. 3 and rotated 90° counterclockwise.

FIG. 6 is a perspective view of a flat container blank of a type which can be de-stacked in accordance with the invention.

FIG. 7 is a side view showing de-stacking of flat articles using the apparatus of this invention.

FIG. 8 is a cross-sectional view taken along line 8—8 of FIG. 7.

FIG. 9 is an end view of a further embodiment of the destacking and feeding system of this present invention.

FIG. 10 is a cross-sectional view taken along line 10—10 of FIG. 9.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIGS. 2-4, reference numeral 1 indicates the destacking and feeding system of the present invention. The destacking and feeding system is particularly useful for de-nesting stacks 3 of nested trays 5, but it will be understood that the invention is not limited to container handling applications.

FIG. 1 shows a typical tray 5 that is advantageously handled by the destacking and feeding system 1. The tray comprises a floor 7, which, for material and weight saving purposes, may be formed with a wide variety of openings, such as are typically represented by circles 9. The floor 7 is rectangular in shape and is bounded by opposed pairs of side walls 11 and 13 upstanding from the floor. The walls 11 and 13 of each pair diverge upwardly. Like the floor 7, the walls 11 and 13 may have various sized openings 15 and 17, respectively. Along the free edge of each side wall 11 and 13 is a solid band portion 19 and 21, respectively. Each band portion 19 and 21 has opposed inside and outside flat faces 23 and 25, respectively, and respective top surfaces 27 and undercut surfaces 29. The trays are dimensioned to hold a desired number of upright articles, such as aluminum beverage cans, not shown. For example, the tray may have a floor that is approximately 10.75 inches wide and 16.13 inches long, with an overall height of 2 inches. The wall band portions 19 and 21 may be approximately 0.75 inches high. Although the trays may be made of any suitable material, it is anticipated that most trays will be made of a tough thermosetting plastic.

The trays 5 are designed so as to be nestable within one another in a stack 3. When nested, the tray band portions 19 and 21 are coplanar. Specifically, the outside faces 25 of the stacked trays are coplanar. The undercut band surface 29 of a tray is supported by the top surface 27 of the band portion of the underlying tray. The angled walls 11 and 13 of a tray fit rather loosely inside the corresponding walls of the underlying tray, thereby creating a neat and space saving stack.

To de-nest a stack 3 of nested trays 5, the destacking and feeding system 1 comprises at least two feed belts 31 forming a first conveyor and at least 2 second, higher speed belts 33 forming a second conveyor. In the preferred embodiment, the feed belts 31 comprise a first pair of feed belts 85 and a second pair of feed belts 86, and the second conveyor 33 comprise a first pair of higher speed belts 91 and a second pair higher speed belts 92. The belt pairs 85, 86, 91, and 92 are supported on a sturdy frame 37 composed of a base 39 and a first pair of legs 41 upstandingly attached to the base. A second pair of legs 43 is attached to the base 39 opposite the legs 41. The frame 37 may include top braces 44 and 46 that connect the tops of the legs 41 and 43, respectively. A plate 45 straddles and is fixed, as by welding, to the legs 43. A similar plate 47 is fixed to the legs 41. To the plate 47 is mounted an adjustment plate 49. Mounting may be by cap screws 51 and set screws 53. By adjusting the cap screws 51 and set screws 53 in proper relation to each other, the adjustment plate 49 can be moved toward and away from the legs 41, and also toward and away from the plate 45.

Secured to each of the plates 45 and 47 are three pairs of pillow blocks 55, 57, 59 and 61, 63, 65, respectively. The pillow blocks 55, 57, and 59 are secured directly to the plate 49. Preferably, spacers 67 are interposed between each of the pillow blocks 61, 63, and 65 and the plate 45. Rotatably mounted between the pairs of pillow blocks 55 and 61 are respective idler shafts 69 and 71. Similar feed shafts 73 and 75 are rotatably mounted between the pairs of pillow blocks 57 and 63, respectively. Somewhat shorter higher speed shafts 77 and 79 are rotatably mounted in the pillow blocks 59 and 65, respectively.

To the outboard ends of the idler shafts 69 and 71 are keyed pulleys 81 and 82, respectively. Similar pulleys 83 are mounted to the outboard ends of the feed shafts 73 and 75; the pulleys 83 are keyed to the feed shafts, as with keys 84, FIG. 5. Trained over associated pulleys 81 and 83 are the two feed belts 85. The second pair of feed belts 86 are trained over the pulleys 82 on feed shaft 71 and the corresponding pulleys 83 on feed shaft 73. The belts 85 and 86 have special configurations, as will be described presently.

Also mounted to the feed shafts 73 and 75 are two pulleys 87. The pulleys 87 are mounted on respective bearings 89 so as to allow relative motion between the shafts 73 and 75 and the respective pulleys 87. Keyed to the higher speed shafts 77 and 79 are respective pulleys 90. The higher speed belts 91 are trained over the pulleys 87 and 89 on shafts 73 and 75, respectively. The higher speed belts 92 are trained over the pulleys 87 and 89 on higher speed shafts 75 and 79, respectively.

To drive the belts 85, 86, 91, and 92, the destacking and feeding system 1 comprises a drive motor 93 mounted to the frame base 39, as by a bracket 95. The motor output shaft 97 is geared or otherwise mechanically coupled to one end of a first input shaft 99 that is rotatably mounted in the frame legs 41. The second end of the first input shaft 99 drives the input of a right angle drive 101. The output of the right angle drive 101 is a shaft 103 that drives a second right angle drive, not illustrated in the drawings, that in turn drives a second input shaft 105 similar to the first input shaft 99. Keyed to each input shaft 99 and 105 is a first sprocket 107 and a second sprocket 109. The diameter of the second sprocket 109 is greater than that of the first sprocket 107.

Rotatably mounted in the frame legs 41 and 43 are a pair of idler shafts 111 and 113, respectively. A pair of sprockets 115 and 117 are keyed to each idler shaft 111 and 113. A chain 119 is trained around the sprockets 107 and 115. The diameters of the sprockets 107 and 115 are such that the idlers shafts 111 and 113 rotate slower than the corresponding input shafts 99 and 105. Sprockets 117 on the idler shafts 111, 113 drive feed shafts 73 and 75 by means of respective chains 120 and sprockets 122 keyed to the shafts 73 and 75. Sprockets 117 and 122 are preferably of equal diameter Therefore, the rotational speed of the feed shafts 73 and 75 is less than the speed of the input shafts 99 and 105.

Trained around each sprocket 109 of the first and second input shafts 99 and 105 is a chain 121. The chains 121 also mesh with sprockets 123 keyed to the shafts 77 and 79. Sprockets 123 have smaller diameters than the sprockets 109, such that the speed of the higher speed shafts 77 and 79 is greater than the speed of the input shafts 99 and 105. Accordingly, the speed of the higher speed shafts 77 and 79 is greater than the speed of the feed shafts 73 and 75. The direction of rotation of the shafts 75 and 79 is in the direction of arrow 125; the direction of rotation of the shafts 73 and 77 is in the opposite direction, arrow 127.

Being keyed to the feed shafts 73, 75 by the respective keys 84, the pulleys 83 are driven by those shafts under the impetus of the corresponding chains 120 and sprockets 122. In turn, the pulleys 83 on the feed shafts 73 and 75 drive the feed belts 85 and 86, respectively. Feed shafts 73 and 75 do not drive pulleys 87 because of the respective bearings 89 between the pulleys 87 and the shafts 73 and 75. Rather, the higher speed belts 91 and 92 are driven by the respective higher speed shafts 77 and 79, to which are keyed the pulleys 89. Thus, operation of the chains 121 and sprockets 123 rotates the higher speed shafts 77 and 79 to drive the higher speed belts 91 and 92, respectively. The direction of the belts 85 and 91 is as shown by arrow 127; direction of the belts 86 and 92 is in the direction of arrow 125.

As described previously, the higher speed shafts 77 and 79 rotate at a faster speed than the shafts 73 and 75. Accordingly, the linear speed of the second, higher speed belts 91, 92 is greater than the linear speed of the feed belts 95, 96.

Looking especially at FIG. 5, each belt 85, 86, 91, and 92 is preferably manufactured as a composite of different components. The first component is a generally conventional V-belt having a trapezoidal cross-section 131. Around the entire outer periphery of the V-belt 131 is vulcanized a synthetic gripper belt 133. The gripper belt 133 has resilient and high friction grips or treads 134. For example, the gripper belt may be a Sparks number 3XLN belt.

To de-nest a stack 3 of trays 5, the stack is deposited vertically into a tray path 135 between the opposed pairs of belts 85, 91 and 86, 92. The spacing between the facing treads 134 of the belts 85, 86 and 91, 92 is slightly less than the width of the trays 5. The outer faces 25 of the tray band portions 19 are gripped in a frictional manner by the treads 134 of the feed belts 85, 86 and are drawn downwardly along path 135 at a speed governed by the shafts 73 and 75. Ultimately, the bottom most tray 5a of the stack reaches the center line of the shafts 73 and 75. At that point, the feed belts 85 and 86 start to return around their respective pulleys 83, and the treads 134 of the second, higher speed belts 91 and 92 take over. As mentioned, the higher speed belts 91, 92 are driven by higher speed shafts 77, 79, respectively, at a greater speed than the speed of the feed belts 85, 86. Consequently, the belts 91, 92 accelerate the tray 5a, pulling that tray from the stack 3 and propelling it at the higher speed along the tray path 135 to the position 5b. At that position, the second, higher speed belts 91, 92 begin their return runs about respective pulleys 89. As a consequence, the second, higher speed belts release their grip on the tray at position 5b. The tray then falls freely onto a waiting conveyor 137 to the position shown at reference numeral 5c. The conveyor 137 operates in the direction of arrow 139 to convey the tray at 5c to a position typically represented by reference numeral 5d. The conveyor 137 operates at a timed relation with the motor 93 such that the trays 5d are properly spaced along the conveyor to suit the operation of a loading station, not shown, at which the trays are filled with compliments of articles. For example, trays may be fed to the loading station at a rate of 65 per minute by controlling the input shafts 99 and 105 to rotate at 10 revolutions per minute, the feed belts 85, 86 at 20 feet per minute, the second, higher speed belts 91, 92 at 100 feet per minute, and the conveyor at 87 feet per minute.

FIG. 6 shows a typical flat article that can be destacked and fed to a folding and/or loading station using the apparatus of the present invention. Blank 205 represents a cardboard container having notches 207 near the corners and score lines 209 parallel to the edges so that end and side flaps can be folded upwardly to form a shallow tray type container. Many other articles such as container blanks having different score and cut lines can be destacked using the apparatus of the present invention as well.

As seen in FIGS. 7 and 8 a stack 203 of flat blanks 205 is placed between the upper conveyor of the destacking apparatus of the present invention which is formed of the same pairs of opposed belts 85, 86 and 81, 83 as hereinabove described The stack 203 is conveyed downwardly by said belts until the lowermost blank 205 engages the lower faster moving pairs of opposed belts 91, 92. By adjusting the speed of the faster belts appropriately relative to the speed of the upper slower moving belts a set 210 of spaced apart articles 205 is conveyed downwardly by the faster moving belts as seen in FIGS. 7 and 8. The bottom articles 205 from the spaced apart stack are sequentially deposited on the moving conveyor belt 137 or similar conveying device. Blanks 205 can be conveyed to a loading station and the edges secured around articles placed thereon or the edge flaps can be folded up to form a shallow tray which is subsequently loaded. The sequence will be dictated, as appreciated by those skilled in the art in accordance with the types of articles being placed in the containers.

It will also be apparent that the destacking and feeding apparatus of the present invention can be used for destacking of flat articles such as flat package inserts which are not loaded with articles. Thus, it will be apparent that the apparatus of the present invention can be utilized for a multitude of applications.

It is also contemplated that a third set of opposed belts forming a third conveyor can be utilized in the practice of the present invention. The use of such multiple sets enables the design of industrial destacking and feeding processes in which the degree of separation between articles in the stack can be positively controlled. The belts of the sets of opposed belts utilized in the practice of the invention can be viewed as rolling clamps which hold the articles after they are separated from the stack in a particular degree of separation from each other. The separated articles are relieved of the weight imposed by the stack above in addition to being separated from each other sufficiently, particularly in the case of nestled articles, that the side walls of the various articles do not interfere with each other during the feeding step. In the case of articles having higher side walls it may be desired to also use a third set of opposed belts, i.e. a third vertical conveyor, so that the articles will not interfere with each other during the feeding step.

Different sized articles 205 or trays 5 are easily accommodated by the destacking and feeding system 1. Adjusting the cap screws 51 and set screws 53, together with changing the thickness of the pillow block spacers 67, alters the distance between the opposed belts 85, 86 and 91, 92. In that manner, change over to different width is accomplished with minimum down time. Similarly, slight variations in the nominal width of a particularly sized article are also handled without difficulty.

In the further embodiment of the invention shown in FIGS. 9 and 10, pairs of opposed wheels 187, 193 and 188, 192 are substituted as the higher speed conveying means. The wheels can be surfaced with an elastomeric surface to aid in frictionally gripping the opposite sides of the articles being destacked. In accordance with this modification, the feed belts can be driven by drive chains or belts 220 journaled in pulleys 219 attached to shafts 169 and 171. The higher speed wheels can be driven by higher speed chains or belts 221 journaled in pulleys 222 and 223 which are attached to hollow drive shafts 174 and 176 to which the wheels 187, 188, 192 and 193 are attached. Idler shafts 173 and 175 are located within the hollow shafts 174 and 176, respectively. In other respects the apparatus of FIGS. 9 and 10 conforms to that already described with respect to FIGS. 1-5. Wheels 187, 188, 192 and 193 are shown at a level with shafts 173 and 175. They can, however be placed at a lower position or made adjustable as to vertical location. In that event, separate, vertically adjustable drive shafts would be employed. The wheels located lower would receive and accelerate, onto a moving conveyor, articles dropped from the bottom of the feed belts.

Other advantages of the present invention include the ability to handle trays with different overall heights and also with different heights of the band portions 19 and 21 without requiring any alterations to the destacking and feeding system 1. For trouble shooting and set-up purposes, a reverse switch can be provided for the motor 93 such that the belts 85, 86, 91, and 92 operate in reverse directions of arrows 127 and 129. In that manner, the stack 3 can be raised vertically upwardly along the path 135 to eject damaged articles that previously went unnoticed.

Thus, it is apparent that there has been provided, in accordance with the invention, a destacking and feeding system that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A system for destacking and feeding a stack of articles having opposite sides comprising:
   a. opposed pairs of feed conveyor means for frictionally engaging the opposite sides of a stack of articles and conveying the articles in a downstream direction along a path at a first speed; and
   b. opposed pairs of second, higher speed conveyor means located downstream of the feed conveyor means for frictionally engaging opposite sides of articles at the bottom of the traveling stack thereof to thereby sequentially pull articles from the bottom of the stack and accelerate the articles in the downstream direction to a second speed greater than the first speed and propel them as a set of spaced apart articles, while frictionally engaged, at the second speed along the conveying path.

2. The destacking and feeding system of claim 1 wherein the feed conveyor means comprises first and second belt means for gripping the opposite sides of the articles in the stack thereof to feed the stack in the downstream direction.

3. The destacking and feeding system of claim 1 wherein the feed conveyor means comprises:
   a. at least one first pair of opposed endless feed belts having a downward run; and
   b. at least one second pair of endless belts having a downward run, the opposed belts of each pair being spaced apart to receive and grip the opposite sides of the stack and to feed the stack in the downstream direction.

4. The destacking and feeding system of claim 1 wherein the feed means comprises:
   a. a first pair of endless feed belts having respective generally coplanar downward runs; and
   b. a second pair of endless feed belts having respective downward runs, the downward runs of the second pair of feed belts being in facing relation to and spaced from the downward runs of the first pair of feed belts at a distance to enable the downward runs of the first and second pairs of feed belts to receive and grip the opposite sides of the stack, the downward runs of the first and second pairs of feed belts defining a conveying path.

5. The destacking and feeding system of claim 1 wherein the second, higher speed conveyor means comprises:
   a. at least one first wheel having a downward run; and
   b. at least one second opposed wheel having a downward run, the wheels being spaced apart to receive and grip the opposite sides of the articles at the bottom of said stack which are conveyed at said higher speed in the downstream direction.

6. The destacking and feeding system of claim 1 wherein the second, higher speed conveyor means comprises:
   a. a first pair of endless higher speed belts having respective generally coplanar downward runs; and
   b. a second pair of endless higher speed belts having respective downward runs, the pairs of belts being spaced apart a distance to engage the opposite sides of the stack of articles.

7. A destacking and feeding system of claim 1 further comprising:

a. first drive means for driving the feed conveyor means at the first speed;
b. second drive means for driving the second, higher speed conveyor means at the second speed; and
c. input drive means for simultaneously driving the first and second drive means at the respective first and second speeds.

8. Apparatus for de-nesting and feeding trays nested in a stack thereof, the trays having opposite sides, comprising:
a. a frame;
b. first and second pairs of feed belts mounted to the frame for receiving and feeding the stack of nested trays in a downstream direction along a tray path at a first speed by frictionally engaging the opposite sides thereof and;
c. first and second higher speed belts mounted to the frame in a downstream direction from the respective first and second pairs of feed belts for frictionally gripping and accelerating trays, sequentially, from the bottom of the stack to a second speed greater than the first speed to pull selected trays from the stack thereof and propel them while frictionally engaged, as a set of spaced apart trays, in the downstream direction along the tray path at the second speed.

9. The apparatus of claim 8 wherein each of the pairs of feed belts are spaced apart to grip the opposite sides of the stack to thereby define the tray path.

10. The apparatus of claim 9 wherein each of the first and second higher speed belts comprises a downward run that is generally coplanar with a downward run of the first and second pairs of feed belts,
so that the stack of trays if fed by the feed belts to the upstream ends of the higher speed belts.

11. The apparatus of claim 8 further comprising:
a. first drive means mounted to the frame for driving the first and second pairs of feed belts at the first speed;
b. second drive means mounted to the frame for driving the first and second higher speed belts at the second speed; and
c. input drive means mounted to the frame for simultaneously driving the first and second drive means.

12. The apparatus of claim 8 further comprising means for receiving selected trays from the higher speed belts and for conveying the selected tray away from the tray path.

13. The apparatus of claim 8 further comprising:
a. first and second feed belt drive means for driving the first and second pairs of feed belts, respectively, at the first speed;
b. first and second higher speed belt drive means for driving the first and second higher speed belts, respectively, at the second speed; and
c. input drive means mounted to the frame for simultaneously driving the first and second feed belt drive means and the first and second higher speed belt drive means.

14. The apparatus of claim 13 wherein:
a. the first and second feed belt drive means comprises first and second feed shaft means mounted to the frame for supporting and driving a respective first and second feed belt; and
b. the input drive means drives the first and second feed shaft means at a speed corresponding to the first speed.

15. The apparatus of claim 14 wherein:

a. the first and second higher speed belt drive means comprises first and second higher speed shaft means mounted to the frame for supporting the driving a respective first and second higher speed belt; and,
b. the input drive means drives the first and second higher speed shaft means at a speed corresponding to the second speed.

16. The apparatus of claim 13 wherein each of the first and second higher speed belts comprises a pair of endless belts.

17. The apparatus of claim 8 further comprising adjustment means interposed between the frame and the first pair of feed belts and the first higher speed belts for adjusting the spacing between the first and second pairs of feed belts and between the first and second higher speed belts to thereby accommodate trays having different spacings between their opposite sides.

18. A destacking and feeding system comprising:
a. a frame having spaced apart upstanding legs;
b. feed belt means mounted to the frame legs for receiving and frictionally gripping a stack of articles and for feeding the stack in a downstream direction along a conveying path at a first speed;
c. higher speed conveyor means mounted to the frame legs for frictionally gripping articles at the bottom of the stack and conveying them while so gripped at a second speed greater than the first speed to thereby pull the articles from the bottom of the stack and propel them in the downstream direction at the second speed as a set of spaced apart articles; and
d. drive means mounted to the frame for driving the feed belt means at the first speed and the higher speed conveyor means at the second speed.

19. The destacking and feeding system of claim 18 wherein the feed belt means comprises at least two feed belts having respective downward runs that are spaced apart a predetermined distance to grip the opposite sides of the articles and to define the article conveying path.

20. The destacking and feeding system of claim 19 wherein the higher speed conveyor means comprises at least two higher speed belts having respective downward runs, the downward runs of each higher speed belt being generally coplanar with the downward run of one of the feed belts, the downward runs of the higher speed belts frictionally gripping opposite sides of the bottom-most articles from the downward runs of the feed belts to accelerate the articles in the downstream direction.

21. The destacking and feeding system of claim 18 wherein the drive means comprises:
a. first and second feed shafts mounted for rotation in respective frame legs and having respective first and second feed pulleys mounted thereon, the first and second feed shafts being driven at a speed corresponding to the first speed;
b. first and second idler shafts mounted for rotation in respective frame legs and having first and second idler pulleys mounted thereon, and
c. first and second feed belts trained over the respective first and second feed pulleys and first and second idler pulleys,
so that rotation of the first and second feed shafts causes the feed belt means to travel at the first speed.

22. The destacking and feeding system of claim 21 wherein the drive means comprises:

a. first and second higher speed shafts mounted for rotation in respective frame legs and having respective first and second higher speed pulleys mounted thereon, the first and second higher speed shafts being driven by an input drive means at a speed corresponding to the second speed;

b. first and second higher speed pulleys mounted to the respective first and second feed shafts for rotation relative thereto; and c. first and second higher speed belts trained over the respective first and second higher speed pulleys on the associated higher speed shafts and feed shafts, so that rotation of the first and second higher speed shafts causes the higher speed conveyor means to travel at the second speed.

23. The destacking and feeding system of claim 18 further comprising means located in the downstream direction from the higher speed conveyor means for conveying away articles pulled from the stack thereof.

24. The destacking and feeding system of claim 18 wherein said higher speed conveyor means comprises opposed pairs of wheels.

25. A method of destacking articles from a stack of articles comprising the steps of:

a. feeding the stack at a first speed along a path by gripping the opposite sides of the stack between a first pair of opposite endless belts;

b. continuously feeding the stack between a second pair of opposed endless conveyor means which grip the opposite sides of said stack, said second endless conveyor means traveling at a second speed greater than the first speed to separate the articles into a set of spaced apart articles continuously traveling, while engaged by said second endless conveyor means, in a downstream direction from the stack, and, continuously feeding the bottom articles from the second endless conveyor means onto a moving conveyor to form a series of separated articles traveling on said moving conveyor.

26. The method of claim 25 wherein the stacked articles comprise flat container blanks.

27. The method of claim 25 wherein the stacked articles comprise nested trays.

28. The method of claim 25 comprising the further step of adjusting the spacing between the belts of the first pair of opposed belts and between the endless conveyor means of the second pair of opposed endless conveyor means to thereby enable different width articles to be gripped.

29. The method of claim 28 comprising the further steps of:

a. providing an input drive operating at a predetermined speed; and b. driving the first pair of opposed belts at the first speed with the input drive and simultaneously driving a second, higher speed pair of opposed belts at the second speed with said input drive.

* * * * *